(12) United States Patent
Apte

(10) Patent No.: US 9,363,187 B2
(45) Date of Patent: Jun. 7, 2016

(54) JITTER BUFFERING SYSTEM AND METHOD OF JITTER BUFFERING

(71) Applicant: Nvidia Corporation, Santa Clara, CA (US)

(72) Inventor: Atul Apte, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 715 days.

(21) Appl. No.: 13/846,205

(22) Filed: Mar. 18, 2013

(65) Prior Publication Data
US 2014/0281017 A1 Sep. 18, 2014

Related U.S. Application Data

(60) Provisional application No. 61/730,940, filed on Nov. 28, 2012.

(51) Int. Cl.
*H04L 12/28* (2006.01)
*H04L 12/841* (2013.01)
*H04L 12/851* (2013.01)
*H04L 29/06* (2006.01)

(52) U.S. Cl.
CPC ............ *H04L 47/28* (2013.01); *H04L 47/2408* (2013.01); *H04L 65/80* (2013.01)

(58) Field of Classification Search
CPC ... H04L 29/08072; H04L 29/06; H04L 43/00; H04L 12/2602; H04L 41/22
USPC .................................................. 709/224, 203
See application file for complete search history.

(56) References Cited

U.S. PATENT DOCUMENTS

| | | | |
|---|---|---|---|
| 2008/0084900 A1* | 4/2008 | Dunn | H04L 43/087 370/516 |
| 2008/0140767 A1* | 6/2008 | Rao | H04L 67/00 709/203 |
| 2008/0155087 A1* | 6/2008 | Blouin | H04L 43/0817 709/223 |
| 2008/0165766 A1* | 7/2008 | Synnergren | H04L 12/66 370/352 |
| 2010/0013839 A1* | 1/2010 | Rawson | G06F 3/14 345/502 |

* cited by examiner

*Primary Examiner* — Duc C Ho

(57) ABSTRACT

A jitter buffering system and a method of jitter buffering. The jitter buffering system may be embodied in a quality of service (QoS) management server, including: (1) a network interface controller (NIC) configured to receive one-way-delay statistics regarding a video stream transmitted to a client, and (2) a processor configured to employ the one-way-delay statistics to calculate and recognize jitter and subsequently generate a command for the client to enable jitter buffering.

20 Claims, 3 Drawing Sheets

JITTER BUFFERING SYSTEM AND METHOD OF JITTER BUFFERING

CROSS-REFERENCE TO RELATED APPLICATION

Figure 1:
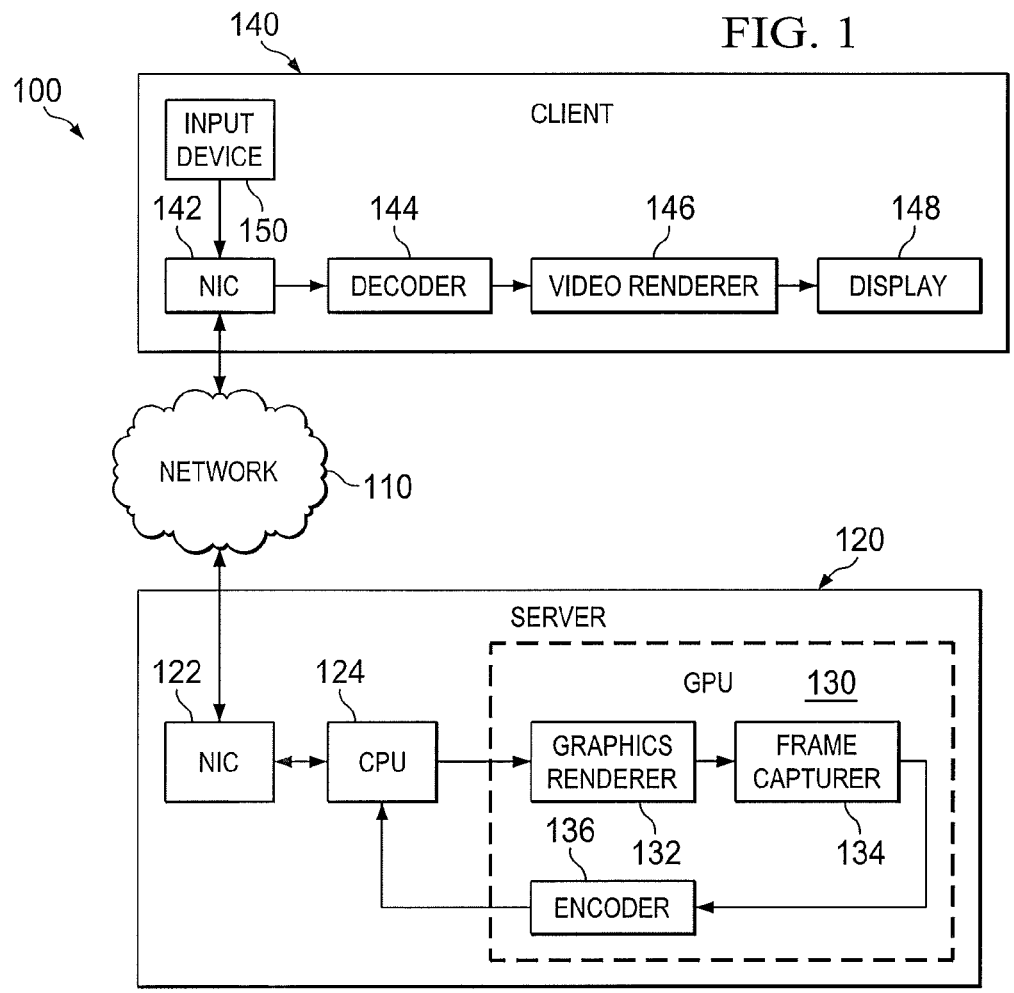

This application claims the benefit of U.S. Provisional Application Ser. No. 61/730,940, filed by Diard, et al., on Nov. 28, 2012, entitled "CLOUD-BASED VIRTUALIZED GRAPHICS PROCESSING FOR REMOTE DISPLAYS", which is commonly assigned with this application and incorporated herein by reference in its entirety.

TECHNICAL FIELD

This application is directed, in general, to cloud gaming and, more specifically, to quality of service (QoS) in the context of cloud gaming.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a quality of service (QoS) management server, including: (1) a network interface controller (NIC) configured to receive one-way-delay statistics regarding a video stream transmitted to a client, and (2) a processer configured to employ the one-way-delay statistics to calculate and recognize jitter and subsequently generate a command for the client to enable jitter buffering.

Another aspect provides a client for displaying a video stream, including: (1) a NIC configured to receive a sequence of frames of the video stream and transmit one-way-delay statistics regarding the video stream to a server, (2) a memory configured to store a plurality of the sequence of frames in a jitter buffer data structure upon receipt of an instruction from the server to enable jitter buffering based on the one-way-delay statistics, and (3) a video renderer configured to periodically recall and render an earliest of the plurality of the sequence of frames for display.

Yet another aspect provides a method of jitter buffering on a client, including: (1) receiving, on a server, one-way-delay statistics based on a video stream transmitted from the server to the client, (2) employing the one-way-delay statistics in calculating and recognizing a level of jitter exceeding a threshold for at least a jitter wait time, and (3) enabling jitter buffering on the client.

BRIEF DESCRIPTION

Figure 2:
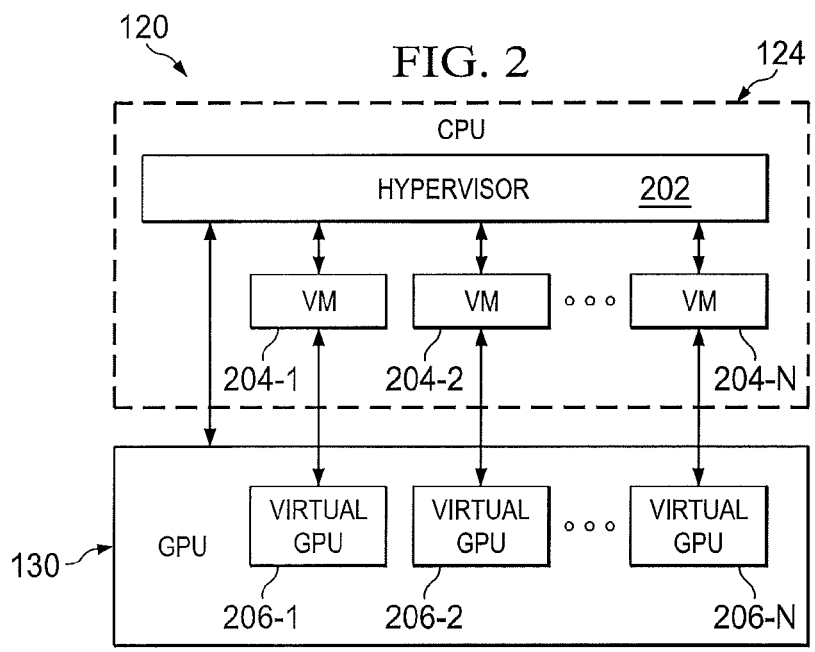
Figure 3:
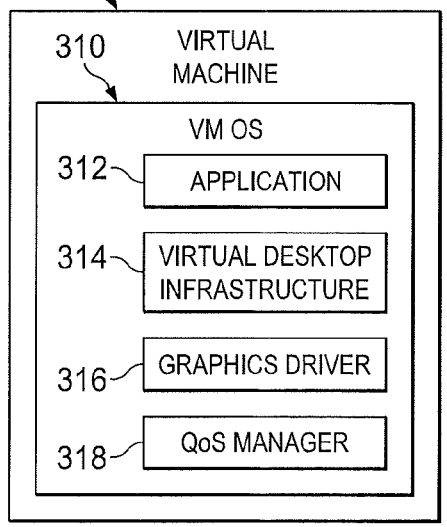
Figure 4:
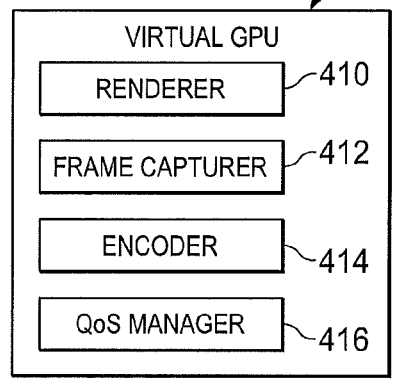
Figure 5:
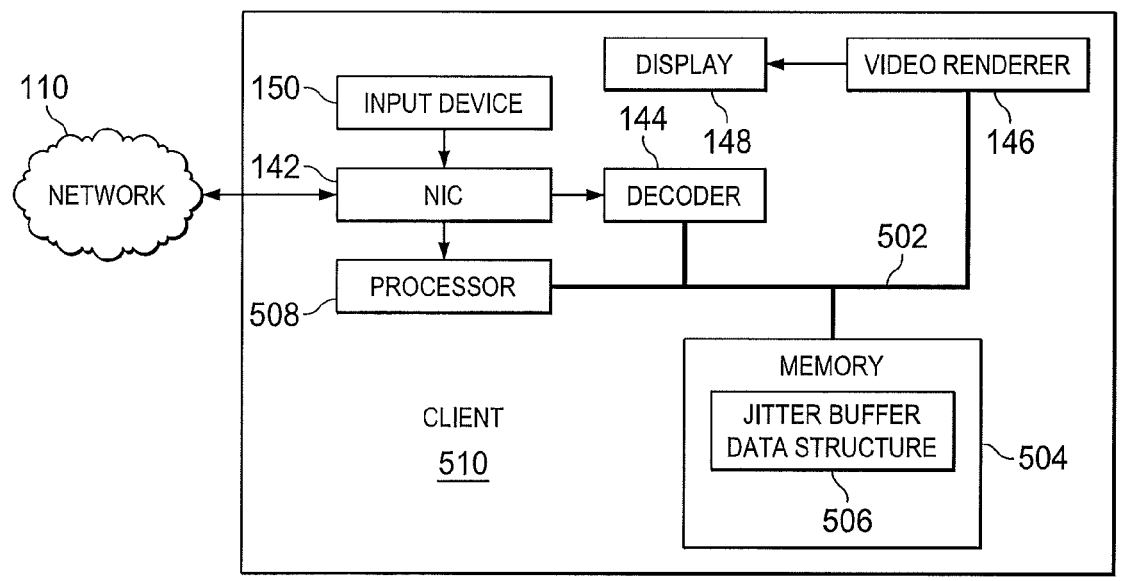
Figure 6:
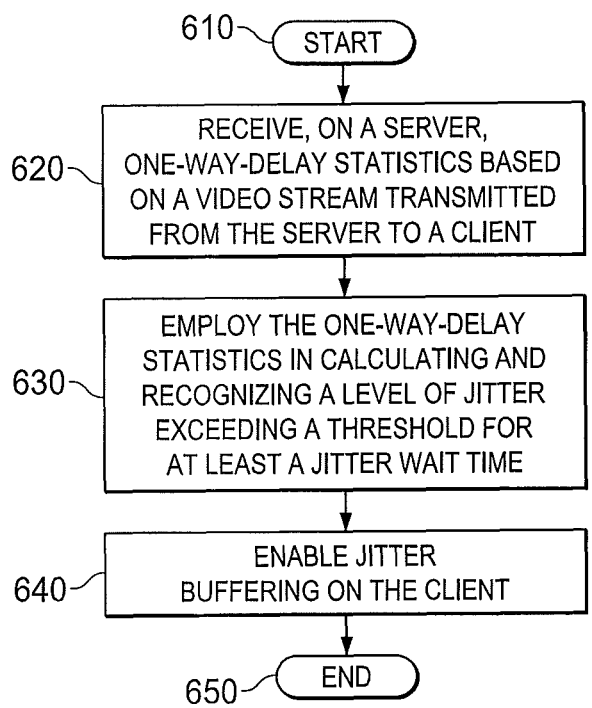

Reference is now made to the following descriptions taken in conjunction with the accompanying drawings, in which:

FIG. 1 is a block diagram of a cloud gaming system;
FIG. 2 is a block diagram of a server;
FIG. 3 is a block diagram of one embodiment of a virtual machine;
FIG. 4 is a block diagram of one embodiment of a virtual GPU;
FIG. 5 is a block diagram of one embodiment of a client configured for jitter buffering; and
FIG. 6 is a flow diagram of one embodiment of a method of jitter buffering.

DETAILED DESCRIPTION

Major limitations of cloud gaming, and cloud graphics processing in general, are latency and the unpredictable network conditions that bring it about. Latency in cloud gaming can be devastating to game play experience. Latency in simple media streaming is less catastrophic because it is overcome pre-encoding the streaming media, buffering the stream on the receiving end, or both. By its nature, cloud gaming employs a significant real-time interactive component in which a user's input closes the loop among the server, client and the client's display. The lag between the user's input and visualizing the resulting effect is considered latency. It is realized herein that pre-encoding or buffering does nothing to address this latency.

Latency is induced by a variety of network conditions, including: network bandwidth constraints and fluctuations, packet loss over the network, increases in packet delay and fluctuations in packet delay from the server to the client, which manifest on the client as jitter. While latency is an important aspect of the game play experience, the apparent fidelity of the video stream to the client is plagued by the same network conditions. Fidelity is a measure of the degree to which a displayed image or video stream corresponds to the ideal. An ideal image mimics reality; its resolution is extremely high, and it has no compression, rendering or transmission artifacts. An ideal video stream is a sequence of ideal images presented with no jitter and at a frame rate so high that it, too, mimics reality. Thus, a higher-resolution, higher-frame-rate, lower-artifacted, lower-jitter video stream has a higher fidelity than one that has lower resolution, a lower frame rate, contains more artifacts or is more jittered.

Latency and fidelity are essentially the client's measures of the game play experience. However, from the perspective of the server or a cloud service provider, the combination of latency and fidelity are components of QoS (QoS). A QoS system, often a server, is tasked with managing QoS for its clients. The goal is to ensure an acceptable level of latency and fidelity, the game play experience, is maintained under whatever network conditions arise and for whatever client device subscribes to the service.

The management task involves collecting network data and evaluating the network conditions between the server and client. Traditionally, the client performs that evaluation and dictates back to the server the changes to the video stream it desires. It is realized herein that a better approach is to collect the network data, or "QoS statistics," on the client and transmit it to the server so the server can evaluate and determine how to improve QoS. Given that the server executes the application, renders, captures, encodes and transmits the video stream to the client, it is realized herein the server is better suited to perform QoS management. It is also realized herein the maintainability of the QoS system is simplified by shifting the task to the server because QoS software and algorithms are centrally located on the server, and the client need only remain compatible, which should include continuing to transmit QoS statistics to the server.

The client is capable of collecting a variety of QoS statistics. One example is packets lost, or packet loss count. The server marks packets with increasing packet numbers. When the client receives packets, it checks the packet numbers and determines how many packets were lost. The packet loss count is accumulated until QoS statistics are ready to be sent to the server. A corollary to the packet loss count is the time interval over which the losses were observed. The time interval is sent with the QoS statistics, to the server, which can calculate a packet loss rate. Meanwhile, the client resets the count and begins accumulating again.

Another example of a QoS statistic is a one-way-delay. When a packet is ready to transmit, the server writes the transmit timestamp in the packet header. When the packet is received by the client, the receipt timestamp is noted. The time difference is the one-way-delay. Since clocks on the server and client are not necessarily synchronized, the one-way-delay value is not the same as the packet transmit time. So, as the client accumulates one-way-delay values for consecutive packets and transmits them to the server, the server calculates one-way-delay deltas between consecutive packets. The deltas give the server an indication of changes in latency.

Yet another example of a QoS statistic is a frame number. Frame numbers are embedded in each frame of video. When the client sends statistics to the server, it includes the frame number of the frame being processed by the client at that time. From this, the server can determine the speed at which the client is able to process the video stream, which is to say, the speed at which the client receives, unpacks, decodes and renders for display.

QoS statistics are sent periodically to the server for use in QoS determinations. It is realized herein the frequency at which the client sends QoS statistics is itself an avenue of tuning QoS to that client. Another example of a QoS setting, realized herein, is dynamic jitter buffering. Jitter is a visualization of fluctuations in packet arrival time on the client. The fluctuations are often caused by network queuing delays or transmission re-tries. The fluctuations can be evident before and after decoding and the result is that frame rendering times are not uniform, which gives the appearance of stuttery playback. Dynamic jitter buffering mitigates this affect. Such a mitigation, it is realized herein, improves the gameplay experience in that it improves the perceived fidelity of the video stream at the expense of latency.

Jitter buffering is a direct introduction of latency into the video stream. It is realized herein that jitter buffering should be actively controlled and should only run when absolutely necessary. It is further realized herein that dynamic jitter buffering accomplishes this by observing jitter levels over time before committing to video streaming with or without jitter buffering. While QoS statistics are collected and transmitted from the client, jitter levels are calculated on the server. It is realized herein that in many cases, QoS settings derived from QoS statistics are implemented on the server, however, dynamic jitter buffering is carried out on the client itself and is merely controlled from the server.

A jitter level is calculated based on the one-way-delay QoS statistics from the client, and, more specifically, the one-way-delay delta statistics the server derives from the one-way-delay values. One example of a jitter calculation is:

$$\text{Jitter}_{new} = \text{Jitter}_{old} + \frac{|\text{one-way-delay delta}| - \text{Jitter}_{old}}{16}.$$

It is also realized herein that, in addition to the QoS statistics, several other QoS settings assume aspects of controlling dynamic jitter buffering. The first is the jitter threshold that, generally, above which jitter buffering should be enabled and below which should be disabled. The calculated jitter level is sensitive to constantly changing network conditions. That being the case, it is realized herein that jitter buffering should not be enabled and disabled as freely as jitter levels rise and fall beyond the jitter threshold. Dynamic jitter buffering introduces a jitter wait time and a no-jitter wait time that create a hysteresis in the enabling and disabling of jitter buffering. Only when the server observes jitter levels above the jitter threshold for at least the jitter wait time is dynamic jitter buffering enabled. Likewise, only when the server observes jitter levels below the jitter threshold for at least the no-jitter wait time is dynamic jitter buffering disabled. Such an arrangement prevents overreactions to temporary network condition changes.

The client traditionally operates by receiving, unpacking, decoding, rendering and displaying N frames per second of video. During perfectly smooth playback, a frame is rendered and displayed precisely every 1/N seconds. Practically, playback is rarely ever that precise or smooth. If playback fluctuates (jitters) too much around that rate, a jitter buffering enabled client would mitigate the effect by enabling dynamic jitter buffering. Rather than frames of video flowing directly from the client network interface controller (NIC), to the decoder, to the video renderer and on to the display, frames are queued in memory, specifically, in a jitter buffer data structure. The queue is inserted into this flow, for example, after decoding, and can hold multiple decoded frames of raw video. Always having at least one decoded frame in the jitter buffer allows the client to render and display reliably every 1/N seconds. Having more than one frame in the jitter buffer means the client simply moves the oldest frame from the jitter buffer to the video renderer every 1/N seconds.

On occasion, the client will experience what is known as a buffer under-run. The jitter buffer is under-run if the client renders and displays frames from the buffer before the buffer is loaded with the next frame, resulting in stuttery playback. In other words, the client needs to increase the jitter buffering. It is realized herein that, practically, dynamic jitter buffering cannot always have at least one frame in the buffer without some further mechanism. It is further realized herein that enforcing a minimum buffering in terms of a minimum number of frames or a minimum buffering time, will mitigate the risks of jitter buffer under-runs. It is also realized herein the client should maintain (as another QoS setting) a ceiling on the potential latency introduced by jitter buffering. By declaring a maximum size for the jitter buffer, a cap is effectively in place for the latency attributable to the jitter buffer.

The ideal utilization of a jitter buffer is determined by a trade-off between latency and smooth non-stuttery playback. The minimum and maximum buffering described above are QoS settings that define where on the spectrum of that trade-off the QoS server and client operate. If utilization exceeds the maximum, older frames can be discarded. Alternatively, if the utilization exceeds the maximum, then the rendering rate, or "drain rate," on the client can be increased, thereby drawing frames from the jitter buffer more quickly. Conversely, if utilization falls below the minimum, under-runs and stuttery playback are possible. To mitigate, as mentioned above, the minimum buffering can be enforced. Alternatively, reducing the rendering rate on the client also helps mitigate the risk of jitter buffer under-runs. These mechanisms can be enabled based on the number of under-runs experience over a period of time.

Additionally, it is realized herein that a variety of other avenues, or QoS settings, for tuning QoS are possible, including: frame rate scaling, resolution scaling, streaming bit rate, minimum and maximum bit rates, minimum and maximum capture frame rates, the frequency of bit rate changes and hysteresis in jitter buffering thresholds.

Before describing various embodiments of the QoS system or method introduced herein, a cloud gaming environment within which the system or method may be embodied or carried out will be described.

FIG. 1 is a block diagram of a cloud gaming system 100. Cloud gaming system 100 includes a network 110 through which a server 120 and a client 140 communicate. Server 120 represents the central repository of gaming content, processing and rendering resources. Client 140 is a consumer of that content and those resources. Server 120 is freely scalable and has the capacity to provide that content and those services to many clients simultaneously by leveraging parallel and apportioned processing and rendering resources. The scalability of server 120 is limited by the capacity of network 110 in that above some threshold of number of clients, scarcity of network bandwidth requires that service to all clients degrade on average.

Server 120 includes a network interface card (NIC) 122, a central processing unit (CPU) 124 and a GPU 130. Upon request from Client 140, graphics content is recalled from memory via an application executing on CPU 124. As is convention for graphics applications, games for instance, CPU 124 reserves itself for carrying out high-level operations, such as determining position, motion and collision of objects in a given scene. From these high level operations, CPU 124 generates rendering commands that, when combined with the scene data, can be carried out by GPU 130. For example, rendering commands and data can define scene geometry, lighting, shading, texturing, motion, and camera parameters for a scene.

GPU 130 includes a graphics renderer 132, a frame capturer 134 and an encoder 136. Graphics renderer 132 executes rendering procedures according to the rendering commands generated by CPU 124, yielding a stream of frames of video for the scene. Those raw video frames are captured by frame capturer 134 and encoded by encoder 136. Encoder 134 formats the raw video stream for transmission, possibly employing a video compression algorithm such as the H.264 standard arrived at by the International Telecommunication Union Telecommunication Standardization Sector (ITU-T) or the MPEG-4 Advanced Video Coding (AVC) standard from the International Organization for Standardization/International Electrotechnical Commission (ISO/IEC). Alternatively, the video stream may be encoded into Windows Media Video® (WMV) format, VP8 format, or any other video encoding format.

CPU 124 prepares the encoded video stream for transmission, which is passed along to NIC 122. NIC 122 includes circuitry necessary for communicating over network 110 via a networking protocol such as Ethernet, Wi-Fi or Internet Protocol (IP). NIC 122 provides the physical layer and the basis for the software layer of server 120's network interface.

Client 140 receives the transmitted video stream for display. Client 140 can be a variety of personal computing devices, including: a desktop or laptop personal computer, a tablet, a smart phone or a television. Client 140 includes a NIC 142, a decoder 144, a video renderer 146, a display 148 and an input device 150. NIC 142, similar to NIC 122, includes circuitry necessary for communicating over network 110 and provides the physical layer and the basis for the software layer of client 140's network interface. The transmitted video stream is received by client 140 through NIC 142. Client 140 can employ NIC 142 to collect QoS statistics based on the received video stream, including packet loss and one-way-delay.

The video stream is then decoded by decoder 144. Decoder 144 should match encoder 136, in that each should employ the same formatting or compression scheme. For instance, if encoder 136 employs the ITU-T H.264 standard, so should decoder 144. Decoding may be carried out by either a client CPU or a client GPU, depending on the physical client device. Once decoded, all that remains in the video stream are the raw rendered frames. The rendered frames a processed by a basic video renderer 146, as is done for any other streaming media. The rendered video can then be displayed on display 148.

An aspect of cloud gaming that is distinct from basic media streaming is that cloud gaming requires real-time interactive streaming. Not only must graphics be rendered, captured and encoded on server 120 and routed over network 110 to client 140 for decoding and display, but user inputs to client 140 must also be relayed over network 110 back server 120 and processed within the graphics application executing on CPU 124. This real-time interactive component of cloud gaming limits the capacity of cloud gaming systems to "hide" latency.

Client 140 periodically sends QoS statistics back to Server 120. When the QoS statistics are ready to be sent, Client 140 includes the frame number of the frame of video being rendered by video renderer 146. The frame number is useful for server 120 to determine how well network 110 and client 140 are handling the video stream transmitted from server 120. Server 120 can then use the QoS statistics to determine what actions in GPU 130 can be taken to improve QoS. Actions available to GPU 130 include: adjusting the resolution at which graphics renderer 132 renders, adjusting the capture frame rate at which frame capturer 134 operates and adjusting the bit rate at which encoder 136 encodes.

FIG. 2 is a block diagram of server 120 of FIG. 1. This aspect of server 120 illustrates the capacity of server 120 to support multiple simultaneous clients. In FIG. 2, CPU 124 and GPU 130 of FIG. 1 are shown. CPU 124 includes a hypervisor 202 and multiple virtual machines (VMs), VM 204-1 through VM 204-N. Likewise, GPU 130 includes multiple virtual GPUs, virtual GPU 206-1 through virtual GPU 206-N. In FIG. 2, server 120 illustrates how N clients are supported. The actual number of clients supported is a function of the number of users ascribing to the cloud gaming service at a particular time. Each of VM 204-1 through VM 204-N is dedicated to a single client desiring to run a respective gaming application. Each of VM 204-1 through VM 204-N executes the respective gaming application and generates rendering commands for GPU 130. Hypervisor 202 manages the execution of the respective gaming application and the resources of GPU 130 such that the numerous users share GPU 130. Each of VM 204-1 through VM 204-N respectively correlates to virtual GPU 206-1 through virtual GPU 206-N. Each of the virtual GPU 206-1 through virtual GPU 206-N receives its respective rendering commands and renders a respective scene. Each of virtual GPU 206-1 through virtual GPU 206-N then captures and encodes the raw video frames. The encoded video is then streamed to the respective clients for decoding and display.

Having described a cloud gaming environment in which the QoS system and method introduced herein may be embodied or carried out, various embodiments of the system and method will be described.

FIG. 3 is a block diagram of virtual machine (VM) 204 of FIG. 2. VM 204 includes a VM operating system (OS) 310 within which an application 312, a virtual desktop infrastructure (VDI) 314, a graphics driver 316 and a QoS manager 318 operate. VM OS 310 can be any operating system on which available games are hosted. Popular VM OS 310 options include: Windows®, iOS®, Android®, Linux and many others. Within VM OS 310, application 312 executes as any traditional graphics application would on a simple personal computer. The distinction is that VM 204 is operating on a CPU in a server system (the cloud), such as server 120 of FIG. 1 and FIG. 2. VDI 314 provides the foundation for separating the execution of application 312 from the physical client desiring to gain access. VDI 314 allows the client to establish a connection to the server hosting VM 204. VDI 314 also allows inputs received by the client, including through a keyboard, mouse, joystick, hand-held controller, or touchscreens, to be routed to the server, and outputs, including video and audio, to be routed to the client. Graphics driver 316 is the interface through which application 312 can generate rendering commands that are ultimately carried out by a GPU, such as GPU 130 of FIG. 1 and FIG. 2 or virtual GPUs, virtual GPU 206-1 through virtual GPU 206-N.

QoS manager 318 collects QoS statistics transmitted from a particular client, such as client 140, and determines how to configure various QoS settings for that client. The various QoS settings influence the perceived fidelity of the video stream and, consequently, the latency. In this embodiment, QoS manager 318 calculates the jitter level experience by the particular client and then determines whether or not dynamic jitter buffering should be enabled. The QoS settings indicate whether dynamic jitter buffering is enabled or disabled, along with the jitter threshold, the jitter wait time, the no-jitter wait time, and in certain embodiments, a maximum jitter buffer size and a minimum jitter buffering parameter for mitigating buffer under-runs.

Once determined, QoS manager 318 implements configuration changes by directing the GPU and client accordingly. Alternatively, the QoS manager tasks can be carried out on the GPU itself, such as GPU 130.

FIG. 4 is a block diagram of virtual GPU 206 of FIG. 2. Virtual GPU 206 includes a renderer 410, a framer capturer 412, an encoder 414 and a QoS manager 416. Virtual GPU 206 is responsible for carrying out rendering commands for a single virtual machine, such as VM 204 of FIG. 3. Rendering is carried out by renderer 410 and yields raw video frames having a resolution. The raw frames are captured by frame capturer 412 at a capture frame rate and then encoded by encoder 414. The encoding can be carried out at various bit rates and can employ a variety of formats, including H.264 or MPEG4 AVC. The inclusion of an encoder in the GPU, and, moreover, in each virtual GPU 206, reduces the latency often introduced by dedicated video encoding hardware or CPU encoding processes.

Similar to QoS manager 318 of FIG. 3, QoS manager 416 collects QoS statistics and determines how to configure various QoS settings for the client. Unlike the embodiment of FIG. 3, the inclusion of QoS manager 416 within virtual GPU 206 allows more direct control over the elements of each virtual GPU, including renderer 410, frame capturer 412 and encoder 414. These elements are largely responsible for implementing the various QoS settings arrived at by QoS manager 416, or QoS manager 318 of the embodiment of FIG. 3. Certain other QoS settings are relayed to the client itself, such as the frequency of QoS statistics transmissions and dynamic jitter buffering.

FIG. 5 is a block diagram of one embodiment of a client 510 capable of carrying out jitter buffering. Client 510 is based on client 140 of FIG. 1 and contains several common components, including: NIC 142, decoder 144, video renderer 146, display 148 and input device 150, each of FIG. 1. In addition to these elements, client 510 includes a processor 508, a memory 504 and a data bus 502. Data bus 502 couples memory 504 to processor 508, decoder 144 and video renderer 146. Memory 504 is configured to store a jitter buffer data structure 506.

A video stream is received by client 510 over network 110 through NIC 142. The video stream is decoded by decoder 144, as it is in client 140 of FIG. 1. When the QoS statistics transmitted back to the server indicate client 510 is experiencing excessive jitter, server transmits a command over network 110 to client 510 to enable dynamic jitter buffering. The command is received via NIC 142 and processed by processor 508. Processor 508 then directs the decoded frames from decoder 144 to jitter buffer data structure 506 through data bus 502. As decoded frames are queued in jitter buffer data structure 506, video renderer 146 periodically draws the oldest decoded frame from memory 504 and renders it for display on display 148. Any fluctuations in packet receive times at NIC 142 are absorbed by the time each frame spends in memory 504. This allows for a slightly latent, but smooth playback of the video stream.

FIG. 6 is a flow diagram of one embodiment of a method of jitter buffering. The method begins at a start step 610. At a step 620, the server receives one-way-delay statistics based on the video stream transmitted from the server to the client. Based on those statistics, at a step 630, the server calculates the jitter being experienced by the client and determines whether the jitter has persisted above the jitter threshold long enough to justify enabling jitter buffering, or alternatively, if jitter buffering is already enabled, if the jitter has persisted below the jitter threshold long enough to justify disabling. If the former is true, jitter buffering is enabled on the client at a step 640. If the latter is true, jitter buffering would be disabled on the client.

In alternate embodiments, determinations would be made as to whether the client has experienced excessive jitter buffer under-runs. If that is the case, in those embodiments, the client would enforce a minimum jitter buffering that could be defined in either a minimum number of frames to buffer or a minimum amount of time to queue frames. Other embodiments also implement a maximum jitter buffer size to cap the potential latency introduced by the dynamic jitter buffering process. The method then ends at a step 650.

Those skilled in the art to which this application relates will appreciate that other and further additions, deletions, substitutions and modifications may be made to the described embodiments.

What is claimed is:

1. A quality of service (QoS) management server, comprising:
   a network interface controller (NIC) configured to receive one-way-delay statistics regarding a video stream transmitted to a client; and
   a processor configured to employ said one-way-delay statistics to calculate and recognize jitter and subsequently generate a command for said client to enable jitter buffering.

2. The QoS management server recited in claim 1 wherein said NIC is further configured to transmit said command to said client.

3. The QoS management server recited in claim 1 wherein said processor is a graphics processing unit (GPU).

4. The QoS management server recited in claim 1 wherein said processor is further configured to generate said command only if jitter exceeds a threshold for at least a jitter wait time.

5. The QoS management server recited in claim 4 wherein said processor is further configured to generate a command for said client to disable jitter buffering if jitter falls below said threshold for at least a no-jitter wait time.

6. The QoS management server recited in claim 1 wherein said processor is further configured to:
   observe a rate of jitter buffer under-runs; and
   generate a command for said client to carry out a minimum jitter buffering if said rate exceeds an under-run threshold.

7. The QoS management server recited in claim 6 wherein a said minimum jitter buffering is the lesser of a minimum buffering time and a time required to buffer a minimum number of frames.

8. A client for displaying a video stream, comprising:
   a network interface controller (NIC) configured to receive a sequence of frames of said video stream and transmit one-way-delay statistics regarding said video stream to a server;
   a memory configured to store a plurality of said sequence of frames in a jitter buffer data structure upon receipt of an instruction from said server to enable jitter buffering based on said one-way-delay statistics; and
   a video renderer configured to periodically recall and render an earliest of said plurality of said sequence of frames for display.

9. The client recited in claim 8 wherein said memory has a configurable maximum storage space allocable to said jitter buffer data structure.

10. The client recited in claim 8 further comprising a decoder configured to decode said sequence of frames before said sequence of frames is subject to storage in said jitter buffer data structure.

11. The client recited in claim 8 further comprising a processer operable to:
   detect an under-run rate for said jitter buffer data structure; and
   employ a minimum jitter buffering if said under-run rate exceeds an under-run threshold.

12. The client recited in claim 11 wherein said minimum jitter buffering is a minimum number of frames to be buffered.

13. The client recited in claim 11 wherein said minimum jitter buffering is a minimum amount of time to buffer.

14. The client recited in claim 11 wherein said video renderer suspends operation until said minimum jitter buffering is achieved.

15. A method of jitter buffering on a client, comprising:
   receiving, on a server, one-way-delay statistics based on a video stream transmitted from said server to said client;
   employing said one-way-delay statistics in calculating and recognizing a level of jitter exceeding a threshold for at least a jitter wait time; and
   enabling jitter buffering on said client.

16. The method recited in claim 15 wherein said jitter wait time is a configurable time interval.

17. The method recited in claim 15 wherein said employing includes calculating one-way-delay delta times among consecutive packets of said video stream.

18. The method recited in claim 15 further comprising buffering at least one frame of video for subsequent video rendering.

19. The method recited in claim 15 further comprising:
   determining a rate of jitter buffer under-runs;
   ensuring a minimum amount of jitter buffering.

20. The method recited in claim 15 further comprising disabling jitter buffering on said client if said level of jitter falls below said threshold for at least a no-jitter wait time.

* * * * *